(12) United States Patent
Mizrahi

(10) Patent No.: US 6,185,023 B1
(45) Date of Patent: Feb. 6, 2001

(54) OPTICAL ADD-DROP MULTIPLEXERS COMPATIBLE WITH VERY DENSE WDM OPTICAL COMMUNICATION SYSTEMS

(75) Inventor: Victor Mizrahi, Columbia, MD (US)

(73) Assignee: Ciena Corporation, Linthicum, MD (US)

( * ) Notice: Under 35 U.S.C. 154(b), the term of this patent shall be extended for 0 days.

(21) Appl. No.: 09/270,488

(22) Filed: Mar. 15, 1999

Related U.S. Application Data

(63) Continuation of application No. 08/846,086, filed on Apr. 25, 1997, which is a continuation-in-part of application No. 08/622,957, filed on Mar. 27, 1996, now Pat. No. 5,748,349.

(51) Int. Cl.⁷ .................................................. H04J 14/02
(52) U.S. Cl. ............................ 359/130; 359/127; 385/37
(58) Field of Search ................................. 359/124, 130, 359/127; 385/24, 37

(56) References Cited

U.S. PATENT DOCUMENTS

| | | | |
|---|---|---|---|
| 5,748,349 | * 5/1998 | Mizrahi | 359/130 |
| 5,778,118 | * 7/1998 | Sridhar | 359/130 |
| 5,982,518 | * 11/1999 | Mizrahi | 359/130 |

FOREIGN PATENT DOCUMENTS

| | | | | |
|---|---|---|---|---|
| 0 794 629 | * 10/1997 | (EP) | | 359/130 |
| 2315380 | * 1/1998 | (GB) | | 359/130 |

* cited by examiner

*Primary Examiner*—Kinfe-Michael Negash
(74) *Attorney, Agent, or Firm*—David L. Soltz

(57) ABSTRACT

The present invention provides add-drop multiplexers which are compatible with dense wavelength division multiplexed (WDM) systems having large numbers of optical channels. The add-drop multiplexers employ sets of Bragg gratings separated by an optical isolator to reliably add or drop optical channels without crosstalk. The Bragg grating sets and the optical isolator are interposed between first and second optical couplers. Optical channels to be dropped from a WDM optical signal are reflected by the first set of Bragg gratings and exit the add-drop multiplexer through the first coupler. Optical channels to be added to a WDM optical signal enter the add-drop multiplexer through the second optical coupler.

1 Claim, 5 Drawing Sheets

OPTICAL ADD-DROP MULTIPLEXERS COMPATIBLE WITH VERY DENSE WDM OPTICAL COMMUNICATION SYSTEMS

CROSS-REFERENCE TO RELATED APPLICATIONS

This application is a continuation of U.S. patent application Ser. No. 08/846,086, filed Apr. 25, 1997 which is a continuation-in-part of U.S. patent application Ser. No. 08/622,957 filed Mar. 27, 1996 (subsequently issued as U.S. Pat. No. 5,748,349 on May 5, 1998) the disclosures of which are incorporated by reference herein.

FIELD OF THE INVENTION

The invention relates to wavelength division multiplexed optical communication systems and, more particularly, to wavelength division multiplexed optical communication systems which include Bragg gratings-based add-drop multiplexers for transferring selected optical channels between optical paths within the optical system.

BACKGROUND OF THE INVENTION

Optical communication systems are a substantial and fast-growing constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, NY) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each information source, the complete signal being constructed from the signal portion collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded, e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. A WDM system employs plural optical signal channels, each channel being assigned a particular channel wavelength. In a WDM system, optical signal channels are generated, multiplexed to form an optical signal comprised of the individual optical signal channels, transmitted over a single waveguide, and demultiplexed such that each channel wavelength is individually routed to a designated receiver. Through the use of optical amplifiers, such as doped fiber amplifiers, plural optical channels are directly amplified simultaneously, facilitating the use of WDM systems in long-distance optical systems.

In many applications, such as optical LANs, cable television subscriber systems, and telecommunications networks, there is a need to route one or more channels of a multiplexed optical signal to different destinations. Such routing occurs when optical channels are sent to or withdrawn from an optical transmission line e.g., for sending optical channels between a terminal and an optical bus or routing long distance telecommunications traffic to individual cities. This form of optical routing is generally referred to as "add-drop multiplexing."

One approach to add-drop multiplexing is explored in Giles and Mizrahi, "Low-Loss ADD/DROP Multiplexers for WDM Lightwave Networks," IOOC Technical Digest, (The Chinese University Press, Hong Kong) c. 1996, pp. 65–67, the disclosure of which is incorporated herein by reference. In this paper, an add-drop multiplexer is proposed which uses two three-port optical circulators with a fiber grating positioned between the two optical circulators. Using this configuration, an optical signal to be dropped from an optical transmission path is reflected by the narrowband fiber grating and exits through the drop port of the optical circulator. All other input signals exit via the through port of the optical circulator. Similarly, an optical signal to be added which has a wavelength nominally identical to the optical signal being dropped from the optical transmission path is input to the add port of the second circulator. The signal to be added to the optical transmission path is reflected towards the though port of the second circulator by the same fiber grating used for signal dropping.

Although the disclosed add-drop multiplexer is adequate for WDM optical systems with greater than about 100 GHz channel spacings (approximately 0.8 nm at 1550 nm wavelength), problems can arise in WDM systems having a closer channel spacing, such as 50 GHz. This close channel spacing may be required for large channel count systems or for long-haul systems. Consequently, any grating used to select a channel must be sufficiently narrow to avoid overlapping the spectral territory of an adjacent channel. FIG. 1 depicts the transmission spectra of a strong grating. Because strong gratings, i.e., those gratings which reflect over approximately 99% of the incident design wavelength, reflect light over a region greater than about 0.8 nanometer (as seen in FIG. 1), they can interfere with the light from adjacent channels. However, when weaker, narrower gratings are used, an example of which is depicted in FIG. 2, a significant portion of the incident signal will be transmitted. If such a grating is used in an add-drop multiplexer, a portion of the incident channel to be dropped will pass through, resulting in coherent crosstalk with the channel of the same wavelength which is added by the multiplexer. Generally, to limit this type of coherent crosstalk it is desirable for attenuation of the dropped optical channel to be greater than about 30 dB, particularly greater than about 40 dB.

Consequently there is a need in the art for add-drop multiplexers which are compatible with dense WDM optical communications systems, particularly those systems which have greater than about 30 optical channels.

SUMMARY OF THE INVENTION

The present invention provides add-drop multiplexers which are compatible with dense WDM systems having large numbers of optical channels. The add-drop multiplexers employ sets of Bragg gratings separated by an optical isolator to reliably add or drop optical channels without significant crosstalk. More particularly, the add-drop multiplexers of the present invention include a first optical coupler having at least first, second, and third input-output ports. A first optical transmission path optically communicates with the first coupler input-output port for carrying a wavelength division multiplexed optical signal which includes one or more optical signals to be dropped from the transmission path.

A second optical transmission path optically communicates with the second coupler input-output port. Positioned in the second optical transmission is a first set of one or more Bragg gratings configured to reflect one or more optical wavelengths included in the wavelength division multiplexed optical communication signal carried by the first optical transmission path. A second set of one or more Bragg gratings configured to reflect one or more optical wavelengths is also positioned in the second optical transmission path, separated from the first set of Bragg gratings by a device which provides optical isolation between the gratings sets. A third optical path optically communicates with the third coupler input-output port for receiving channels to be dropped from the wavelength division multiplexed optical communication signal.

The add-drop multiplexer further includes a second optical coupler having at least first, second, and third coupler input-output ports and configured such that the second optical transmission path optically communicates with the first coupler input-output port. A fourth optical transmission path optically communicates with the second input-output port of the second optical coupler for transporting optical channels to be added to through channels from the first optical transmission path. The combined optical signals from the first and second input-output ports of the second optical Coupler, i.e., the "through" optical channels and the "add" optical channels, are output through the third input-output port of the second optical coupler.

DETAILED DESCRIPTION

Figure 3:
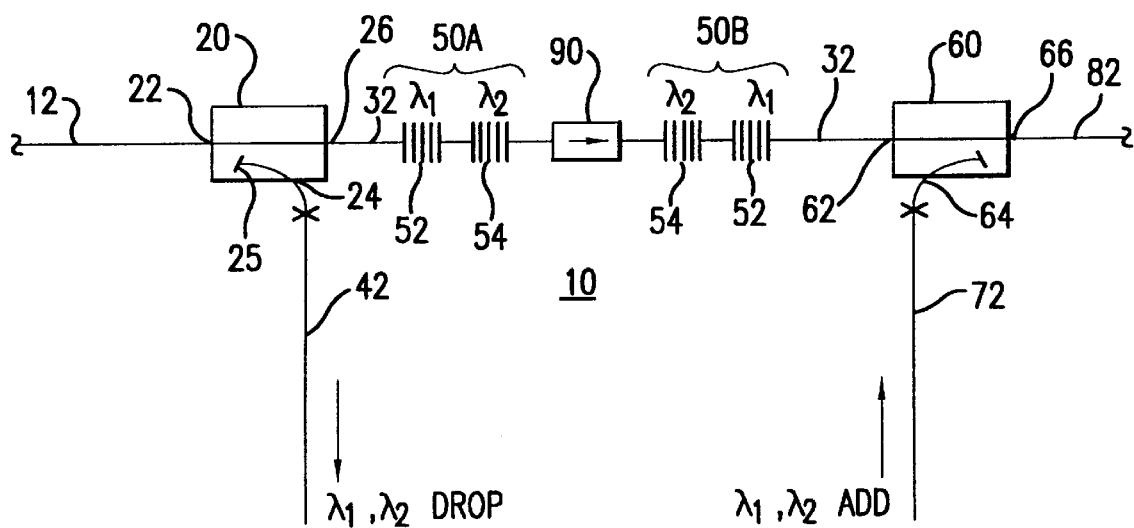
FIG. 3 schematically depicts an add-drop multiplexer according to one embodiment of the present invention.

Turning now to the drawings in detail, in which like numerals indicate the same or similar elements, FIG. 3 depicts an add-drop multiplexer 10 according to one embodiment of the present invention. Add-drop multiplexer 10 comprises an optical coupler 20 for coupling optical signals to be added to an optical transmission system. Optical coupler 20 is selected from any optical device which can receive optical signals from plural input-output ports and place the optical signals onto an input-output port (with the remaining optical fiber terminated at 25). The expression "input-output" is used since ports in such couplers can be used in either manner, depending upon how they are interposed into an optical system. Typically, the optical signals from two input ports are equally combined and placed on the output path although the two input paths can be combined in various ratios (e.g., 70:30, 80:20, etc.) depending upon the needs of the optical system (e.g., when desiring to equalize signal strength from two optical paths). Exemplary optical couplers are 1×2 fused fiber optical splitters, commercially available from Corning and Gould, used to combine signals rather than split the signals. Other suitable optical couplers include dichroic couplers, interference couplers, waveguide couplers, and optical circulators. Optical coupler 20 includes first input port 22, second input port 24, and output port 26.

A first optical transmission path 12 optically communicates with first coupler port 22. The expression "optically communicates" as used herein, refers to any connection, coupling, link, or the like, by which optical signals carried by one optical system element are imparted to the "Communicating" element. Such "optically communicating" devices are not necessarily directly connected to one another, but may be separated by intermediate optical components or devices. In an exemplary embodiment, optical transmission path 12 is a singe mode optical fiber which forms the principal transmission medium for carrying a wavelength division multiplexed optical signal in a wavelength division multiplexed optical communication system.

Figure 2:
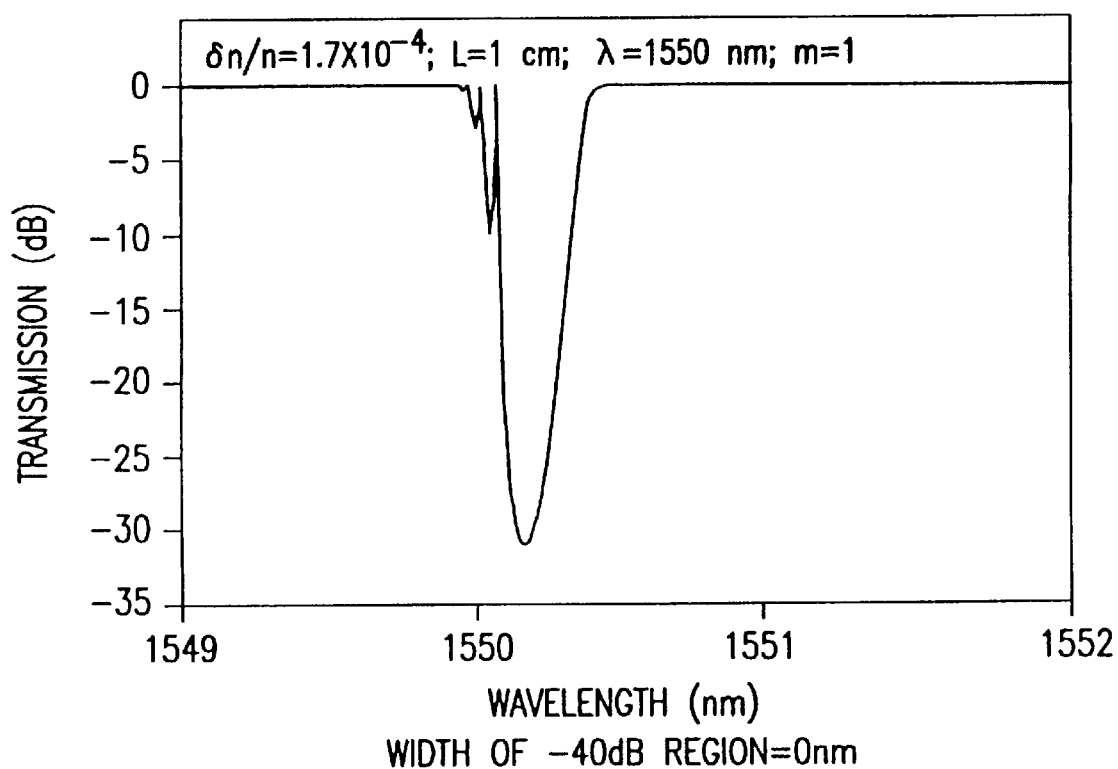
FIG. 2 schematically depicts the transmission spectrum for a weak Bragg grating.

A second transmission path 32 optically communicates with second coupler port 24. Positioned within optical transmission path 32 are first and second sets of one or more Bragg gratings 50A and 50B separated by optical isolator 90. In the depicted add/drop multiplexer, two Bragg gratings, 52 and 54, respectively corresponding to wavelengths of $\lambda_1$ and $\lambda_2$ form the sets of Bragg gratings 50A and 50B. While two Bragg gratings are depicted in FIG. 3, it is understood that the set of optical gratings can be one grating up to plural optical gratings. Further, a single broad grating may be used to drop (or attenuate) more than one optical channel. Isolator 90 permits optical signals to be unidirectionally transmitted in the illustrated direction while optical signals propagating in the opposite direction are attenuated. Each of the Bragg gratings in gratings sets 50A and 50B can be selected from "weak" gratings having transmission profiles similar to that depicted in FIG. 2. However, it is understood that any Bragg) gating can be employed in the present invention which reflects the desired optical channel(s) and does not substantially interfere with adjacent optical channels.

While an optical isolator is depicted in the device of FIG. 3, it is understood that any optical component which provides substantial isolation between the gratings sets, including, but not limited to, optical circulators, can be used in the present invention.

Figure 1:
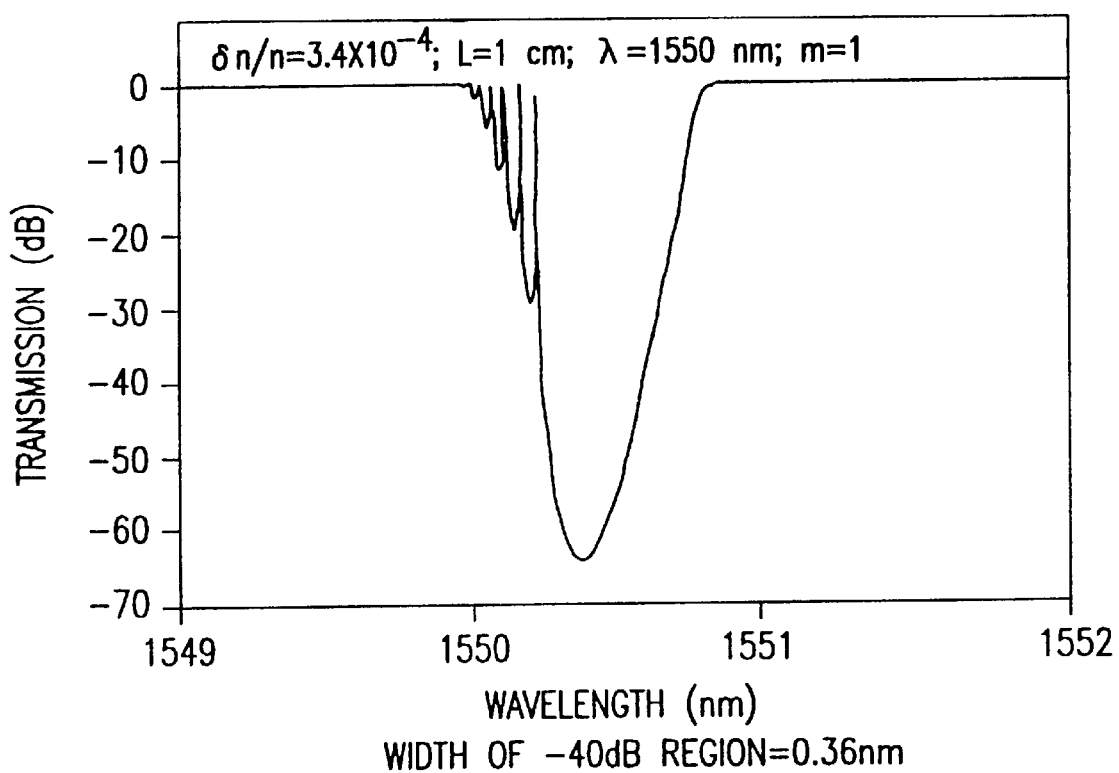
FIG. 1 schematically depicts the transmission Spectrum for a strong Bragg grating.
Figure 4:
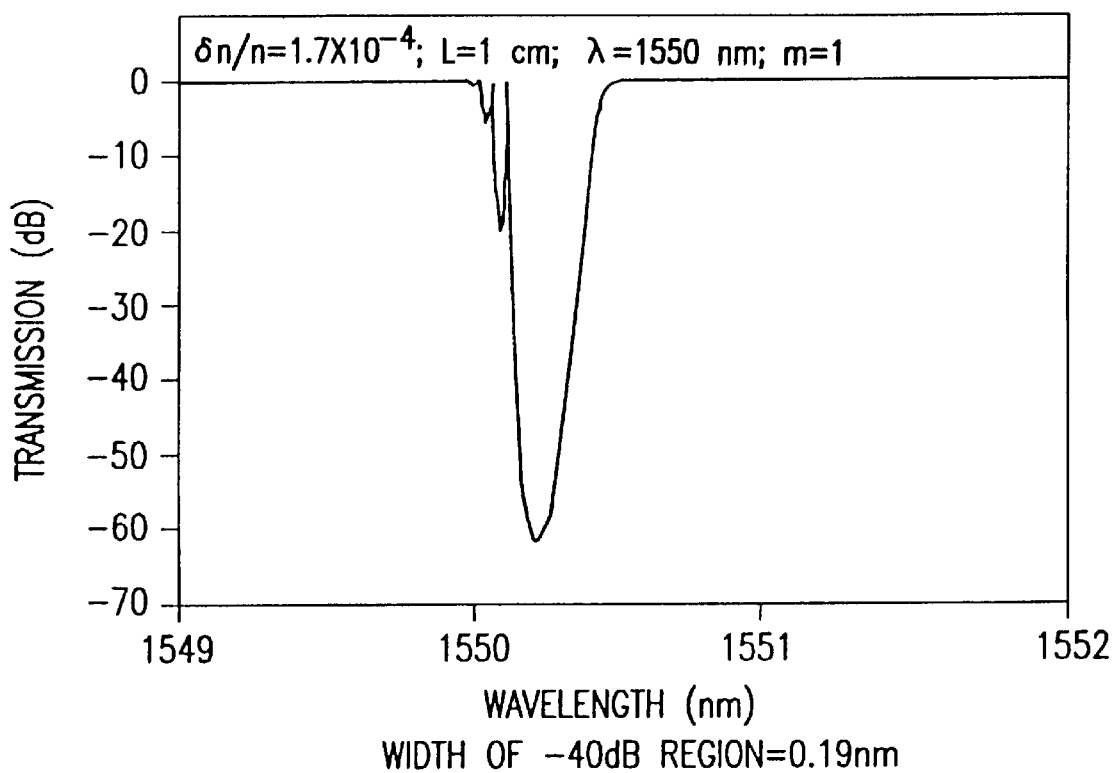
FIG. 4 schematically depicts the transmission spectrum for two weak Bragg gratings separated by an optical isolator.

The transmission spectrum formed by two weak gratings in series separated by an optical isolator is depicted in FIG. 4. As can be seen from this FIG., a narrow, strong grating is formed in which nearly all of the incident light is reflected (as with the strong grating of FIG. 1) but which would not interfere with an adjacent, closely-spaced channel.

Typically, Bragg gratings 52 and 54 comprise a series of photoinduced refractive index perturbations in an optical fiber which reflect optical signals within a selected wavelength band. Bragg gratings suitable for use in the optical system of the present invention are described in Morey et al., "Photoinduced Bragg, Gratings in Optical Fibers," *Optics and Photonics News*, February 1994, pp. 8–14, the disclosure of which is incorporated by reference herein.

In an exemplary embodiment when a broad grating is used in grating set 50, the grating is chirped. Advantageously, the grating is chirped is such a manner as to reflect the wavelengths in sequential order from shortest to longest wavelengths. Methods of fabricating chirped gratings are disclosed in Farries et al. *Electronics Letters*, Vol. 30, No. 11, May 29, 1995, pp. 891–892, the disclosure of which is incorporated by reference herein. When plural Bragg gratings are employed, the individual Bragg gratings can also be chirped gratings.

Although the set of gratings 50 is depicted as comprising fixed gratings, the add-drop multiplexer can be selected to be reconfigurable through the use of tunable optical filtering elements. For example, the gratings set 50 can be temperature tuned such that the reflection wavelength is shifted in or out of an optical channel band. In an exemplary embodiment, the out-of-band position is a wavelength band situated between adjacent optical channels. When the (grating reflection wavelength is tuned to an optical channel band, the corresponding optical channel is dropped. When the grating reflection wavelength is tuned out of an optical channel band, the corresponding optical channel is a "through" channel, i.e., a channel which is transmitted unaffected through add-drop multiplexer 10. In another technique, the gratings are mechanically strained to shift the reflection wavelength in or out of optical channel bands. Alternatively, the gratings can be thermally or mechanically tuned to different optical channels. In this manner, control of either temperature or mechanical strain functions to create a reconfigurable add-drop multiplexer.

Although gratings 52 in grating sets 50A and 50B have nominally the same wavelength, the center wavelengths of each of these gratings may be slightly offset from one another. The combined spectrum of such offset gratings is slightly wider without interfering with adjacent channels and may be advantageous for certain applications. Further, the gratings in gratings sets 50A and 50B may be dissimilar in other grating characteristics such as chirping, grating tilt, grating strength, etc.

A third optical transmission path 42 optically communicates with third optical coupler port 26. Optical transmission path 42 receives optical signals which are reflected by the set of Bragg gratings 50A back towards second circulator port 24. These signals are thus "dropped" from a wavelength division multiplexed signal carried by transmission path 12.

A second optical coupler 60 is used to couple optical signals to be added to an optical transmission system. Optical coupler 60 may be substantially similar to optical coupler 20 in the first section of the add-drop multiplexer and includes first input-output port 62, second input-output port 64, and third input-output port 66 (although it is understood that the optical coupler can be selected from any of the optical couplers discussed above). First port 62 optically communicates with optical transmission path 32 for receiving those optical signals output by first optical coupler port 26 which are not dropped by grating set 50A, i.e., the "through" optical signals.

A fourth optical transmission path 72 optically communicates with second coupler port 64 for adding optical signals to the through optical signals received by the first coupler port 62 of second optical coupler 60. Because coupler 60 combines the optical signals from input ports 62 and 64, the optical signals which are added via transmission path 72 do not contact grating set 50B but are directly combined with the signals from port 62 and exit through port 66. Consequently, an arbitrary number of optical channels may be added to the optical system; the wavelengths of the optical channels do not need to correspond to the wavelengths of the channels dropped by grating set 50A.

A fifth optical transmission path 82 optically communicates with coupler output port 66 for receiving the combined optical signal from the first and second input ports. As with optical transmission path 12, optically transmission path 82 is typically a single mode optical fiber which forms the principal transmission medium of a WDM optical communication system.

Optionally an attenuation element (not shown) is positioned in optical path 32. Such an optical attenuation element equalizes signal levels between the optical signals from optical path 32 and the optical signals from optical path 72. In an exemplary embodiment, the optical attenuation element is selected from high attenuation optical fiber, commercially available from AT&T/Lucent Technologies or build-out attenuators commercially available from Amp. An optical isolator (not shown) is optionally positioned in optical transmission path 82 to prevent amplified spontaneous emission (ASE) from downstream amplifiers from entering coupler 60 through output port 66.

In an exemplary embodiment, the operation of add-drop multiplexer 10 is as follows. A wavelength division multiplexed optical signal heaving optical channels 1–8 propagates along optical transmission path 12 and enters coupler 20 through port 22. Channels 1–8 are output through port 26 onto optical path 32. Optical channels 1–2 are respectively reflected by gratings 52 and 54 back through port 26 and output onto optical path 42 through port 24. From optical path 42 they are routed to a demultiplexer system and optical receivers, or routed to another optical transmission path. Optical channels 3–8 are transmitted through isolator 90 and both grating sets 50A and 50B and continue on path 32 to input port 62 of optical coupler 60.

Small portions of optical channels 1 and 2 are transmitted through gratings 52 and 54 of grating set 50A since gratings 52 and 54 are weak gratings which do not reflect all of the incident signals. The small portions of channels 1 and 2 pass through isolator 90 and are reflected by gratings 52 and 54 of grating set 50B. The optical isolator 90 attenuates these reflected signals, preventing Fabry-Perot resonances from being formed between the two grating sets. In this manner, the narrow gratings needed for very dense WDM systems can be employed without adverse consequences caused by the small signal portions which are transmitted through such gratings.

Optical channels to be added, e.g., new optical channels 1–2 (using nominally the same signal wavelengths as dropped channels 1–2), additional optical channels 9–12, or a combination thereof, are input to coupler port 64 from transmission path 72. Through optical channels 3–8 and new optical channels 1–3 are combined by coupler 60 and output through port 66 onto output path 82. This newly-created WDM optical signal continues propagation along the transmission path of the optical communication system.

Figure 5:
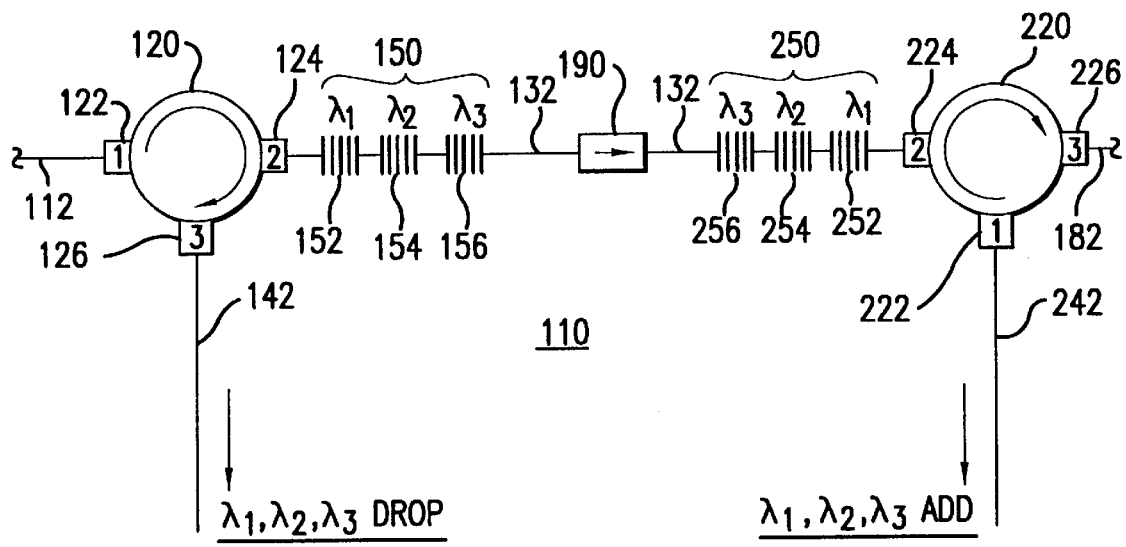
FIG. 5 schematically depicts an add-drop multiplexer according to a further embodiment of the present invention.

FIG. 5 depicts an add-drop multiplexer 110 according to a further embodiment of the present invention. Add-drop multiplexer 110 comprises a first three-port optical circulator 120 having first circulator port 122, second Circulator port 124 and third circulator port 126, and a second three-port optical circulator 220 having first circulator port 222, second circulator port 224, and third circulator port 226. A first optical transmission path 112 optically communicates with first Circulator port 122 for carrying a wavelength division multiplexed optical communication signal. A second optical transmission path 132 optically communicates with both the second port 124 of the first optical circulator and the second port 224 of the second optical circulator.

Positioned in second optical transmission path 132 are first and second sets of Bragg gratings, respectively 150 and 250, separated by optical isolator 190. As in the add-drop multiplexer of FIG. 1, Bragg grating set 150 includes gratings 152, 154, and 156 respectively corresponding to wavelengths of $\lambda_1$, $\lambda_2$, and $\lambda_3$ where $\lambda_1<\lambda_2<\lambda_3$. By ordering the gratings from shortest wavelength to longest wavelength, no optical channel is transmitted through the radiation mode loss region of a grating during transmission or reflection. As in the previous embodiment, one or more broad chirped gratings, configured to reflect wavelengths in an order from shortest to longest, can be used to reflect the optical channels to be dropped. Optical signals having these wavelengths are reflected back through port 2 of circulator 150 and output onto "drop" optical transmission path 142.

Bragg grating set 250 includes gratings 252, 254, and 256 also corresponding to wavelengths of $\lambda_1$, $\lambda_2$, and $\lambda_3$ where $\lambda_1<\lambda_2<\lambda_3$. Optical signals to be added to an optical system are carried by optical transmission path 242 into the first port 222 of the second optical circulator and encounter gratings set 250 when the signals are output onto transmission path 132 through the second port 224 of the second circulator. These "add" optical signals are reflected back towards circulator port 224 along with the through optical channels transmitted through first and second gratings sets 150 and 250. The combined optical signals are output through the third port 226 of optical circulator 220 onto optical transmission path 182. As with optical transmission path 112, optical transmission path 182 is typically a single mode optical fiber which forms the principal transmission medium for an optical communication system. As with the grating set 50 of the previous embodiment, one or more of the individually gratings can be thermally tunable or strain tunable such that the add-drop multiplexer is configurable to selectively add or drop particular optical channels. It is understood that the gratings sets 150 and 250 with three grating,s each is an illustrative embodiment and that any number of gratings can be employed in gratings sets 150 and 250.

As in the add-drop multiplexer of the previous embodiment, an isolator 190 is positioned between grating set 150 and grating set 250. This isolator attenuates the optical signals reflected by grating set 250, preventing Fabry-Perot resonances between like gratings on either side of the isolator from leaked optical signals.

In an exemplary embodiment, operation of add-drop multiplexer 110 is as follows. A wavelength division multiplexed optical signal having optical channels 1–8 propagates along optical transmission path 112 and enters circulator 120 through first circulator port 122. Channels 1–8 are output through second circulator port 124 onto optical path 32. Optical channels 1–3 are respectively reflected by gratings 152, 154, and 156 back through second circulator port 124 and output onto drop optical path 142 through third circulator port 126. From optical path 142 they are routed to a demultiplexer system and optical receivers, or routed to another optical transmission path. Optical channels 4–8 are transmitted through grating set 150 and continue on path 132 through isolator 190.

Optical channels to be added, e.g., new optical channels 1–3 (using the nominally same signal wavelengths as dropped channels 1–3), are input to second optical circulator port 222 from add optical path 242. Optical channels 1–3 are respectively reflected by gratings 252, 254, and 256 back through circulator port 224, exiting the second optical circulator through port 226 onto transmission path 182. Through optical channels 4–8 are similarly passed through circulator port 224 and output onto transmission path 182 through third circulator port 226, forming a newly-created WDM optical signal comprising the add channels and the through channels. This newly-created WDM optical signal continues propagation along the transmission path of the optical communication system.

Figure 6:
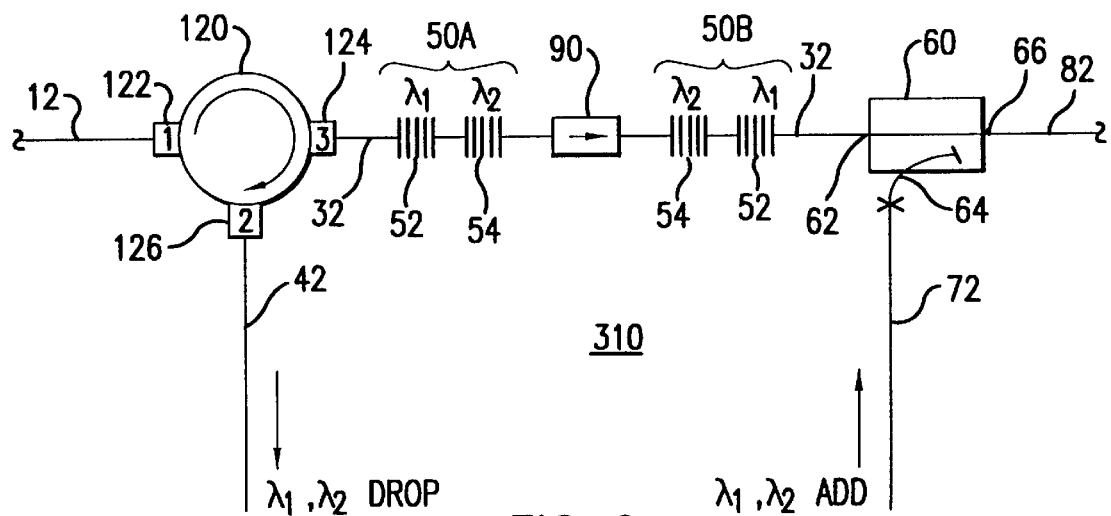
FIG. 6 schematically depicts an add-drop multiplexer according to a further embodiment of the present invention.

A further embodiment of an add-drop multiplexer 310 is depicted in FIG. 6. In this embodiment, an optical circulator 120, substantially similar to the optical circulator of FIG. 5, is used to drop optical channels. An optical coupler 60, substantially similar to optical coupler 60 of FIG. 3, is used to add optical channels. As in the previous embodiments, an optical filter comprising two sets of Bragg gratings is positioned on the optical path which optically communicates with both the optical circulator and the optical coupler. As in the embodiment of FIG. 3, the operation of add-drop multiplexer 310 is asymmetrical in that different optical channels can be dropped and added by the device.

While the foregoing, invention has been described in terms of the embodiments discussed above, numerous variations are possible. For example, although specific add-drop multiplexers are depicted in the disclosure, it is understood that numerous variations of such add-drop multiplexers are possible using a variety of couplers and gratings arranged in many configurations. Such variations include changing the orientation of the optical couplers of FIG. 3 or the use of an optical circulator as the second optical coupler in FIG. 3. Accordingly, modifications and changes such as those suggested above, but not limited thereto, arc considered to be within the scope of following claims.

What is claimed is:

1. An optical add-drop multiplexer comprising:

an optical path configured to carry a wavelength division multiplexed optical communication signal having one or more optical channels each at a respective wavelength;

a first Bragg grating, positioned along said optical path, configured to reflect an optical wavelength included in said multiplexed optical signal, wherein said first Bragg grating is also configured to transmit a portion of said optical wavelength;

a second Bragg grating, positioned along said optical path, configured to reflect said optical wavelength; and optical isolation means interposed between said first and second Bragg gratings, wherein said optical isolation means is configured to attenuate said portion of said optical wavelength transmitted by said first Bragg grating and reflected by said second Bragg grating sufficiently to prevent optical resonances from being formed between said first and second Bragg gratings.

* * * * *